United States Patent
Zhang (10) Patent No.: US 9,593,619 B2
(45) Date of Patent: Mar. 14, 2017

(54) EXHAUST SYSTEM

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 14/724,109

(22) Filed: May 28, 2015

(65) Prior Publication Data
US 2016/0348562 A1 Dec. 1, 2016

(51) Int. Cl.
F02B 33/44 (2006.01)
F01N 13/08 (2010.01)

(52) U.S. Cl.
CPC ...................... *F01N 13/08* (2013.01)

(58) Field of Classification Search
CPC ........................................ F01N 13/08
See application file for complete search history.

(56) References Cited

U.S. PATENT DOCUMENTS

| | | | | |
|---|---|---|---|---|
| 5,123,243 A * | 6/1992 | Baddour | ............... | F01N 3/0222 55/283 |
| 5,768,888 A * | 6/1998 | Matros | ................ | F01N 13/0097 422/170 |
| 6,082,100 A * | 7/2000 | Boegner | ............ | B01D 53/9495 123/443 |
| 6,594,991 B2 * | 7/2003 | Itoh | ..................... | B01D 46/0036 60/274 |
| 8,276,366 B2 | 10/2012 | Bennet et al. | | |
| 9,021,804 B2 | 5/2015 | Zhang | | |
| 2006/0070381 A1 * | 4/2006 | Parlow | ..................... | F02B 37/00 60/612 |
| 2010/0139267 A1 * | 6/2010 | Schliesche | ............. | F02M 26/35 60/602 |
| 2010/0199839 A1 * | 8/2010 | Zhang | ................... | F01N 3/0233 95/23 |
| 2015/0275825 A1 * | 10/2015 | Ohrem | .................. | F01N 3/0205 60/320 |

FOREIGN PATENT DOCUMENTS

JP 2005171932 A 6/2005

OTHER PUBLICATIONS

Zhang, Xiaogang, "Engine Exhaust System," U.S. Appl. No. 15/063,673, filed Mar. 8, 2016, 71 pages.

* cited by examiner

*Primary Examiner* — Jesse Bogue
(74) *Attorney, Agent, or Firm* — Julia Voutyras; John D. Russell; B. Anna McCoy (57) ABSTRACT

Methods and systems are provided for flowing exhaust gas in an exhaust system of an engine. In one example, a method may include flowing exhaust gas through a turbine, from the turbine to at least one aftertreatment device, and then from the at least one aftertreatment device to atmosphere, during a first condition. The method may also include, during a second condition, flowing exhaust gas through the at least one aftertreatment device, from the at least one aftertreatment device to the turbine, and then from the turbine to atmosphere.

20 Claims, 6 Drawing Sheets

EXHAUST SYSTEM

FIELD

The present description relates generally to methods and systems for controlling exhaust flow in an engine exhaust system.

BACKGROUND/SUMMARY

Engine exhaust systems for turbocharged engines commonly include the turbocharger arranged upstream in an exhaust flow direction from the exhaust aftertreatment devices (e.g., catalysts). Such an arrangement, while suitable for fast turbocharger response during some conditions, can lead to increased emissions during cold start conditions due to exhaust heat loss through the turbine of the turbocharger. Further, the exhaust backpressure created by the aftertreatment devices results in increased turbine outlet pressure, reducing the efficiency of the turbocharger.

Other attempts to address the issue of compromised emissions due to heat loss through the turbine include an aftertreatment device closely coupled to the engine. One example approach is shown by Bennet et al. in U.S. Pat. No. 8,276,366. Therein, a plurality of aftertreatment devices are coupled in a housing having multiple flow paths to allow flow of exhaust through one or more of the aftertreatment devices and a turbine of a twin turbocharger. Depending on operating conditions, the exhaust may flow through a turbine prior to flowing through one or more of the aftertreatment devices, or the exhaust may flow through one of the aftertreatment devices prior to flowing through a turbine.

However, the inventors herein have recognized potential issues with such systems. As one example, in every possible flow path in the housing of Bennet, exhaust always flows through at least one aftertreatment device after flowing through a turbine. Thus, the system of Bennet still suffers from the increased turbine outlet pressure that results from subsequent exhaust flow through downstream aftertreatment devices. As a further example, when a flow path is selected that routes exhaust from the engine directly to a turbine and then through one or more aftertreatment devices, it results in one of the aftertreatment devices (an oxidation catalyst) being bypassed altogether. Thus, at least in some examples, emissions may still be comprised. Further still, in Bennet, exhaust always flows through a turbine before flowing through a particulate filter, and thus particulate matter may impinge on the turbine blades, eventually leading to turbine degradation.

In one example, the issues described above may be addressed by a method for an exhaust system of an engine. The method includes, during a first condition, flowing exhaust gas through a turbine, from the turbine to at least one aftertreatment device, and then from the at least one aftertreatment device to atmosphere, and during a second condition, flowing exhaust gas through the at least one aftertreatment device, from the at least one aftertreatment device to the turbine, and then from the turbine to atmosphere. In this way, a flow path through the exhaust system may be selected that prioritizes turbine response (e.g., during the first condition) or that priorities rapid aftertreatment device light-off (e.g., during the second condition).

As one example, the first condition may be an engine acceleration event where a large torque increase is requested (e.g., during a vehicle launch), and thus the exhaust may be routed directly to the turbine to quickly provide the requested torque. The second condition may be engine cold start conditions where the one or more aftertreatment devices are below light-off temperature, and thus exhaust may be routed through the at least one aftertreatment device prior to traveling through the turbine. In both the first and second conditions, exhaust still flows through both the turbine and the at least one aftertreatment device, and thus no trade-off between emissions and turbine response is required. Further, by maintaining the turbocharger physically between the engine and the at least one aftertreatment device, packaging challenges that result from placing the aftertreatment devices before the turbocharger can be avoided. Further still, if the at least one aftertreatment device includes a particulate filter, by flowing exhaust through the particulate filter before the turbine, at least during some conditions, particulate matter impingement on the turbine may be reduced, increasing the life of the turbine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for routing exhaust through an exhaust system coupled to an engine. The exhaust system may include two flow paths. During a standard mode of operation, the exhaust system may be operated so that exhaust flows through the system via a first flow path. In the first flow path, exhaust flows through a turbine of a turbocharger prior to flowing through one or more downstream aftertreatment devices. During a bypass mode of operation, the exhaust system may be operated so that exhaust flows through the system via the second flow path. In the second flow path, exhaust flows through each of the one or more aftertreatment devices prior to flowing through the turbine. The exhaust system may be operated in the standard mode of operation when rapid turbocharger response is desired, such as in response to an operator tip-in (e.g., vehicle or engine acceleration event) and/or during standard, steady-state operating conditions where the engine is operating below peak output, the aftertreatment devices have reached light-off temperature, engine particulate matter production is below a threshold, etc. In contrast, the exhaust system may be operated in the bypass mode of operation when rapid aftertreatment device warm-up is desired, such as during engine cold start conditions, when the engine is operating at peak output, and/or when engine particulate matter production is above a threshold. In this way, the drawbacks associated with placing the aftertreatment devices downstream of the turbocharger turbine, namely heat loss through the turbine during engine warm-up and increased exhaust backpressure, may be mitigated while still retaining the benefits of a turbocharger that is closely coupled to the engine (e.g., rapid turbocharger response during transients, packaging efficiency, etc.).

Figure 1:
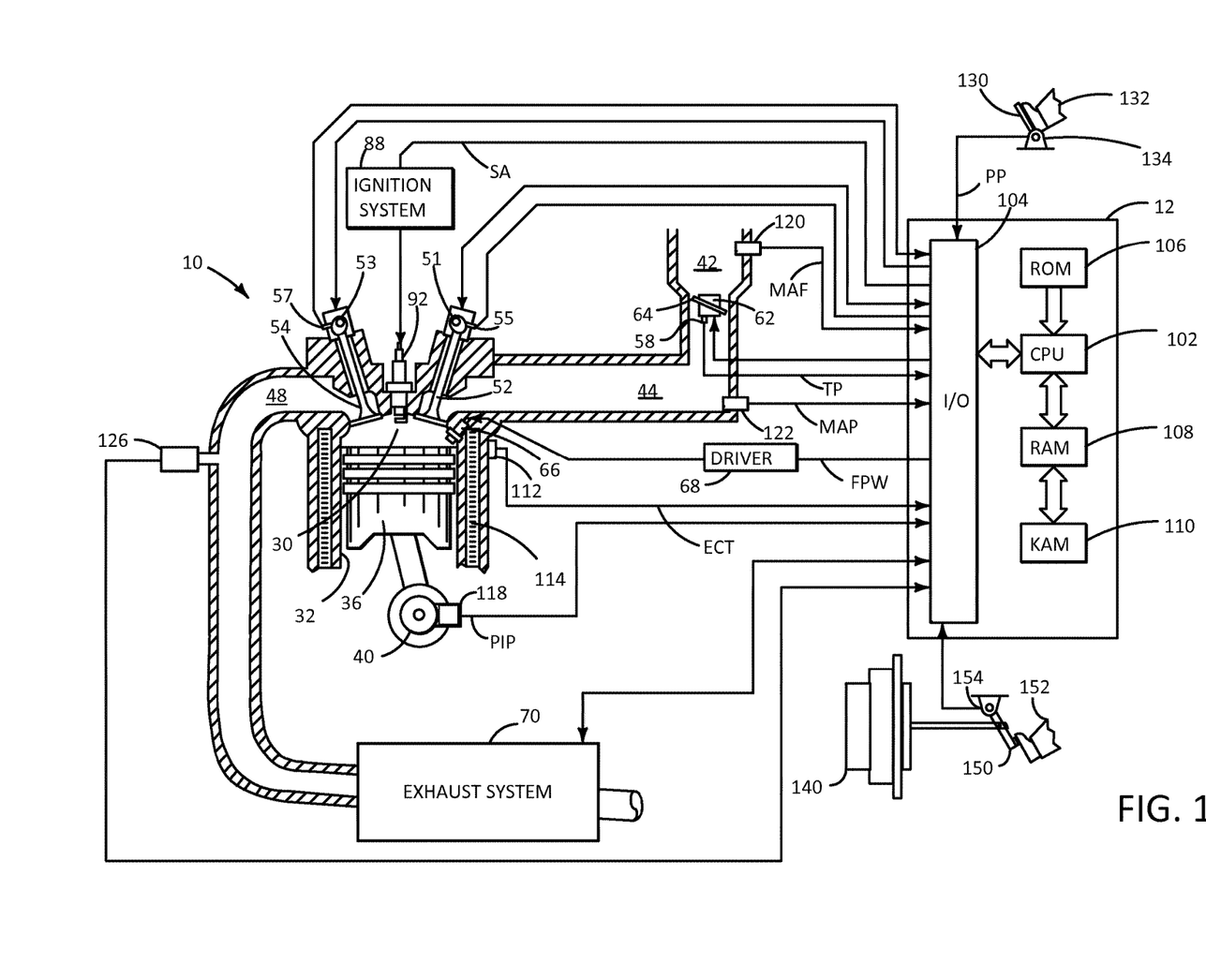
FIG. 1 shows a single cylinder of a multi-cylinder engine.
Figure 2:
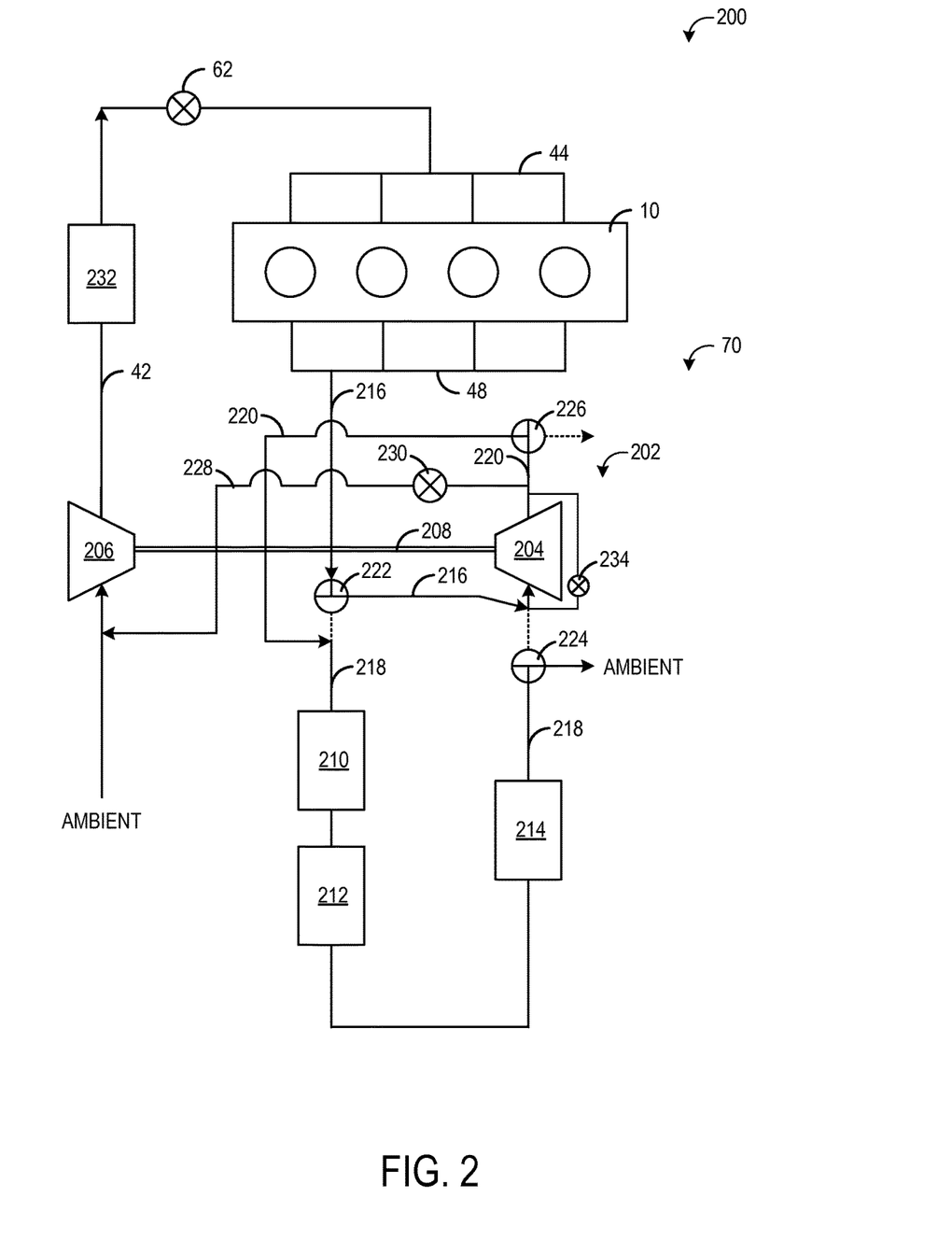
FIG. 2 schematically shows an exhaust system coupled to the multi-cylinder engine of FIG. 1 in a first operating mode.
Figure 3:
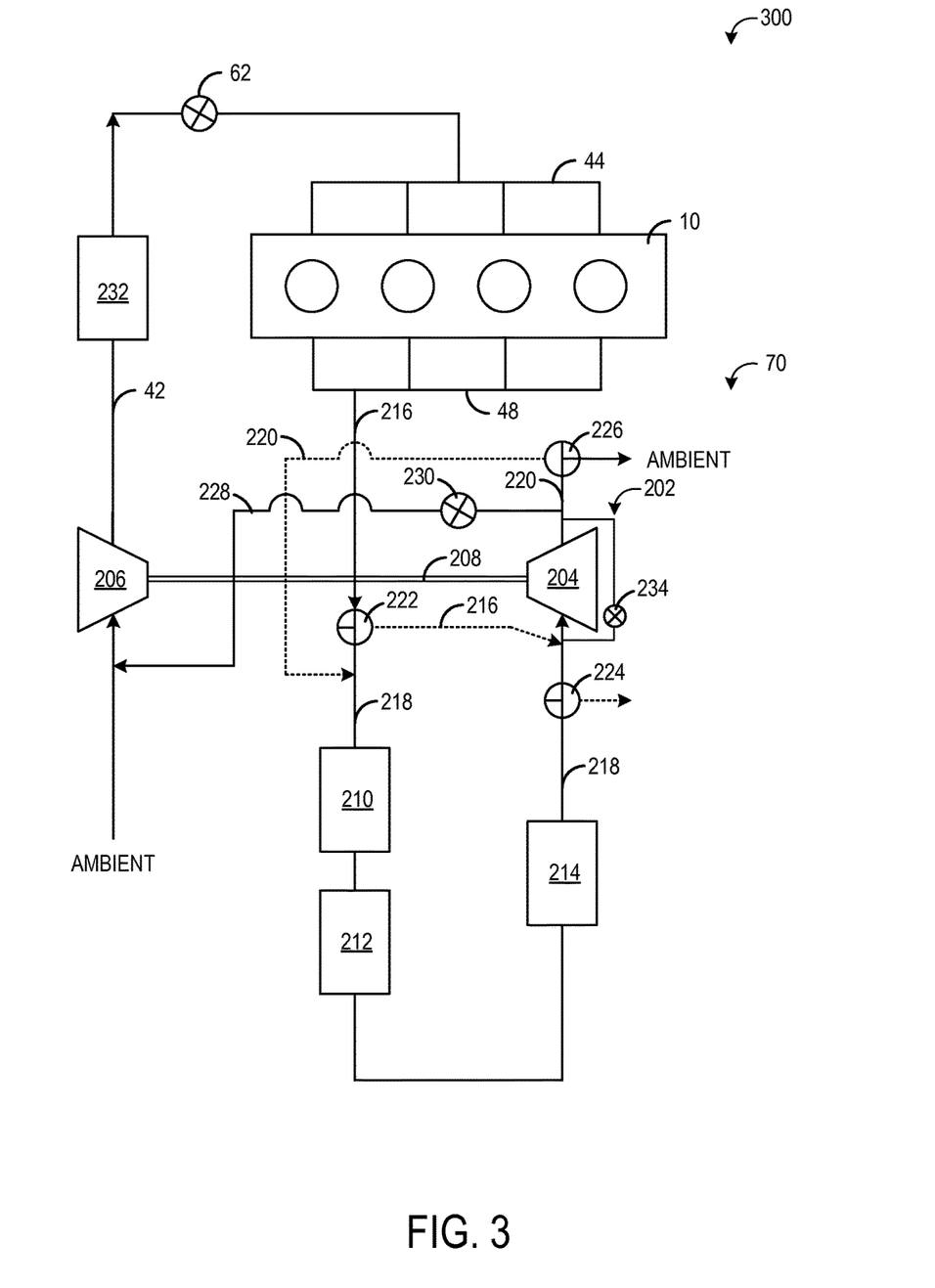
FIG. 3 shows the exhaust system of FIG. 2 in a second operating mode.

FIG. 1 shows a single cylinder of a multi-cylinder engine that is coupled to an exhaust system, such as the exhaust system described above. FIG. 2 shows the exhaust system during the standard mode of operation. FIG. 3 shows the exhaust system during the bypass mode of operation. The engine and exhaust system of FIGS. 1-3 may be controlled by a control unit, such as the controller of FIG. 1. The controller may store in memory instructions executable to carry out one or more methods to control the exhaust system, such as the methods illustrated in FIGS. 4-6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. However, in examples where compression ignition is utilized, the ignition system 88 may be dispensed with. Universal Exhaust Gas Oxygen (UEGO) sensor 126 is shown coupled to exhaust manifold 48 upstream of an exhaust system 70, which will be described in more detail with respect to FIGS. 2-3. Alternatively, a two-state exhaust gas oxygen sensor may be substituted for UEGO sensor 126.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples. Further, the engine may be a compression ignition engine configured to operate with diesel fuel, for example, and thus during operation ignition via spark plug 92 may be dispensed with.

Vehicle wheel brakes or regenerative braking via a driveline integrated starter/generator (DISG) may be provided when brake pedal 150 is applied via foot 152. Brake pedal sensor 154 supplies a signal indicative of brake pedal position to controller 12. Foot 152 is assisted by brake booster 140 applying vehicle brakes.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined. Controller 12 may also receive signals from sensors located in exhaust system 70 and/or may trigger one or more actuators of exhaust system 70.

The controller 12 receives signals from the various sensors of FIG. 1 (as well as FIGS. 2-3, described below) and employs the various actuators of FIG. 1 and FIGS. 2-3 to adjust engine operation based on the received signals and instructions stored on a memory of the controller. In one example, controller 12 may receive signals from temperature sensor 112, position sensor 134, Hall effect sensor 118, MAP sensor 122, MAF sensor 120, and/or other sensors, and based on the signals from the sensors, determine whether to operate the exhaust system 70 in a standard or bypass mode of operation and consequently trigger one or more actuators based on the determined mode of operation. For example, controller 12 may move a plurality of three-way valves of FIGS. 2-3 into respective set positions based on the determined mode of operation, as described in more detail below. Further, controller 12 may actuate a wastegate of a turbocharger, described below, to provide desired boost pressure.

FIG. 2 schematically illustrates the exhaust system 70 of FIG. 1 in a standard mode 200. As explained above with respect to FIG. 1, engine 10 includes a plurality of cylinders, herein depicted as four cylinders arranged in-line, although other configurations are possible. Engine 10 receives intake air via intake manifold 44 and exhausts exhaust gas via exhaust manifold 48.

Exhaust system 70 includes a turbocharger 202 including a compressor 206 arranged in intake passage 42, and an exhaust turbine 204 arranged along an exhaust passage (specifically, at a junction between a first passage 216 and a third passage 220, described in more detail below). Compressor 206 may be at least partially powered by exhaust turbine 204 via a shaft 208. A charge air cooler (CAC) 232 may be positioned in intake passage 42, downstream of compressor 206, for cooling the boosted aircharge prior to delivery to the engine cylinders. Throttle 62 is provided along the intake passage of the engine for varying the flow rate and/or pressure of intake air provided to the engine cylinders. For example, throttle 62 may be disposed downstream of compressor 206 as shown in FIG. 2, or alternatively may be provided upstream of compressor 206. Some or all of the exhaust gases can bypass turbine 204 via a turbine bypass passage controlled by a wastegate 234.

Exhaust system 70 includes one or more exhaust aftertreatment devices. As illustrated, exhaust system 70 includes a first aftertreatment device 210, a second aftertreatment device 212, and a third aftertreatment device 214. The aftertreatment devices may include one or more of a three-way catalyst (TWC), hydrocarbon trap, particulate filter, muffler, oxidation catalyst, lean NOx trap (LNT), selective catalytic reduction (SCR) system, or other suitable aftertreatment device. In one specific example, engine 10 may be a gasoline engine and first aftertreatment device 210 may be a TWC, second aftertreatment device 212 may be an underbody converter, and third aftertreatment device 214 may be a muffler. In another specific example, engine 10 may be a diesel engine and first aftertreatment device 210 may be a diesel oxidation catalyst, second aftertreatment device 212 may be a diesel particulate filter, and third aftertreatment device 214 may be an SCR/LNT. The examples provided above are non-limiting, and other configurations are possible.

Exhaust system 70 further includes a plurality of exhaust passages and three-way valves to direct flow of exhaust through the turbine 204 and plurality of aftertreatment devices. Exhaust manifold 48 is fluidically coupled to first passage 216. First passage 216 has an inlet coupled to exhaust manifold 48 and an outlet coupled to an inlet of turbine 204. Thus, first passage 216 is configured to direct exhaust gas directly from exhaust manifold 48 to turbine 204, at least under some conditions.

First passage 216 includes a first three-way valve 222 at a junction between first passage 216 and a second passage 218. Second passage 218 has an inlet fluidically coupled to first passage 216 via first three-way valve 222 and an outlet fluidically coupled to the inlet of turbine 204. The aftertreatment devices 210, 212, and 214 are each disposed along second passage 218. Second passage 218 further includes a second three-way valve 224 coupling second passage 218 to atmosphere. Thus, second passage 218 is configured to direct exhaust gas received from first passage 216 via first three-way valve 222 through each of the aftertreatment devices and either to atmosphere or to the inlet of turbine 204.

An outlet of the turbine 204 is fluidcially coupled to a third passage 220. Third passage 220 has an inlet fluidcially coupled to the outlet of the turbine 204 and an outlet fluidcially coupled to second passage 218. The outlet of third passage 220 is coupled to second passage 218 upstream of first aftertreatment device 210 and downstream of first three-way valve 222. A third three-way valve 226 couples third passage 220 to atmosphere. Thus, third passage 220 is configured to direct exhaust gas from the outlet of the turbine 204 to either atmosphere or to second passage 218. Additionally, as explained below, under some conditions at least a portion of the exhaust gas from third passage 220 may be routed back to the intake of the engine via an exhaust gas recirculation (EGR) system.

Further, in the disclosed embodiments, an exhaust gas recirculation (EGR) system may route a desired portion of exhaust gas from third passage 220 to intake manifold 44. FIG. 2 shows an LP-EGR system wherein LP-EGR is routed through LP-EGR passage 228 from downstream of turbine 204 to upstream of compressor 206. An inlet of LP-EGR passage 228 is coupled to third passage 220 downstream of the outlet of the turbine 204 and upstream of third three-way valve 226.

The amount of LP-EGR provided to intake passage 42 may be varied by controller 12 via LP-EGR valve 230. Likewise, there may be an HP-EGR system (not shown) wherein HP-EGR is routed through an HP-EGR passage from upstream of turbine 204 to downstream of compressor 206. For example, an HP-EGR passage may branch off from first passage 216 and couple to intake passage 42 downstream of compressor 206. The LP-EGR system may include an LP-EGR cooler (not shown) to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within the EGR passage or intake passage and may provide an indication of one or more of mass flow, pressure, temperature, concentration of 02, and concentration of the exhaust gas. In some embodiments, one or more sensors may be positioned within LP-EGR passage 228 or intake passage 42 to provide an indication of one or more of a flow rate, pressure, temperature, and concentration of 02 or another species to determine LP EGR flow rate and concentration relative to air flow rate. Exhaust gas diverted through LP-EGR passage 228 may be diluted with fresh intake air at a mixing point located at the junction of LP-EGR passage 228 and intake passage 42. Specifically, by adjusting LP-EGR valve 230, a dilution of the EGR flow may be adjusted.

As shown in FIG. 2, the exhaust system 70 is operating in a standard mode 200 where each of the first three-way valve 222, second three-way valve 224, and third three-way valve 226 are in respective first positions. In the first position, first three-way valve 222 blocks the fluid coupling of the second passage 218 to the first passage 216, and thus exhaust travels directly from the exhaust manifold to the inlet of the turbine via first passage 216. In the first position, second three-way valve 224 fluidly couples second passage 218 to atmosphere. In the first position, third three-way valve 226 blocks the fluid coupling of third passage 220 to atmosphere. Thus, in the standard mode of operation, exhaust travels along a first flow path that includes from the exhaust manifold, directly to the turbine via the first passage; from the turbine to the second passage via the third passage; and from the second passage, through the plurality of aftertreatment devices and to atmosphere via the second passage. In an example, when each of the first, second, and third three-way valves are in the respective first positions, the first three-way valve is configured to direct exhaust only to the turbine, the second three-way valve is configured to direct exhaust only to atmosphere, and the third three-way valve is configured to direct exhaust only to the at least one aftertreatment device (via the third passage and second passage).

FIG. 3 schematically shows exhaust system 70 operating in a bypass mode of operation 300 where each the first three-way valve 222, second three-way valve 224, and third three-way valve 226 are in respective second positions. In the second position, first three-way valve 222 fluidically couples the second passage 218 to the first passage 216, and thus exhaust travels from the exhaust manifold to the plurality of aftertreatment devices without first passing through the turbine. In the second position, second three-way valve 224 fluidly couples second passage 218 to the inlet of the turbine. In the second position, third three-way valve 226 fluidically couples third passage 220 to atmosphere. Thus, in the bypass mode of operation, exhaust travels along a second flow path that includes from the exhaust manifold to the second passage via the first passage; through the aftertreatment devices and to the turbine via the second passage; and from the turbine to atmosphere via the third passage.

In one example, when each of the first, second, and third three-way valves are in the respective second positions, the first three-way valve is configured to direct exhaust only to the second passage, the second three-way valve is configured to direct exhaust only to the turbine, and the third three-way valve is configured to direct exhaust only to atmosphere.

Figure 4:
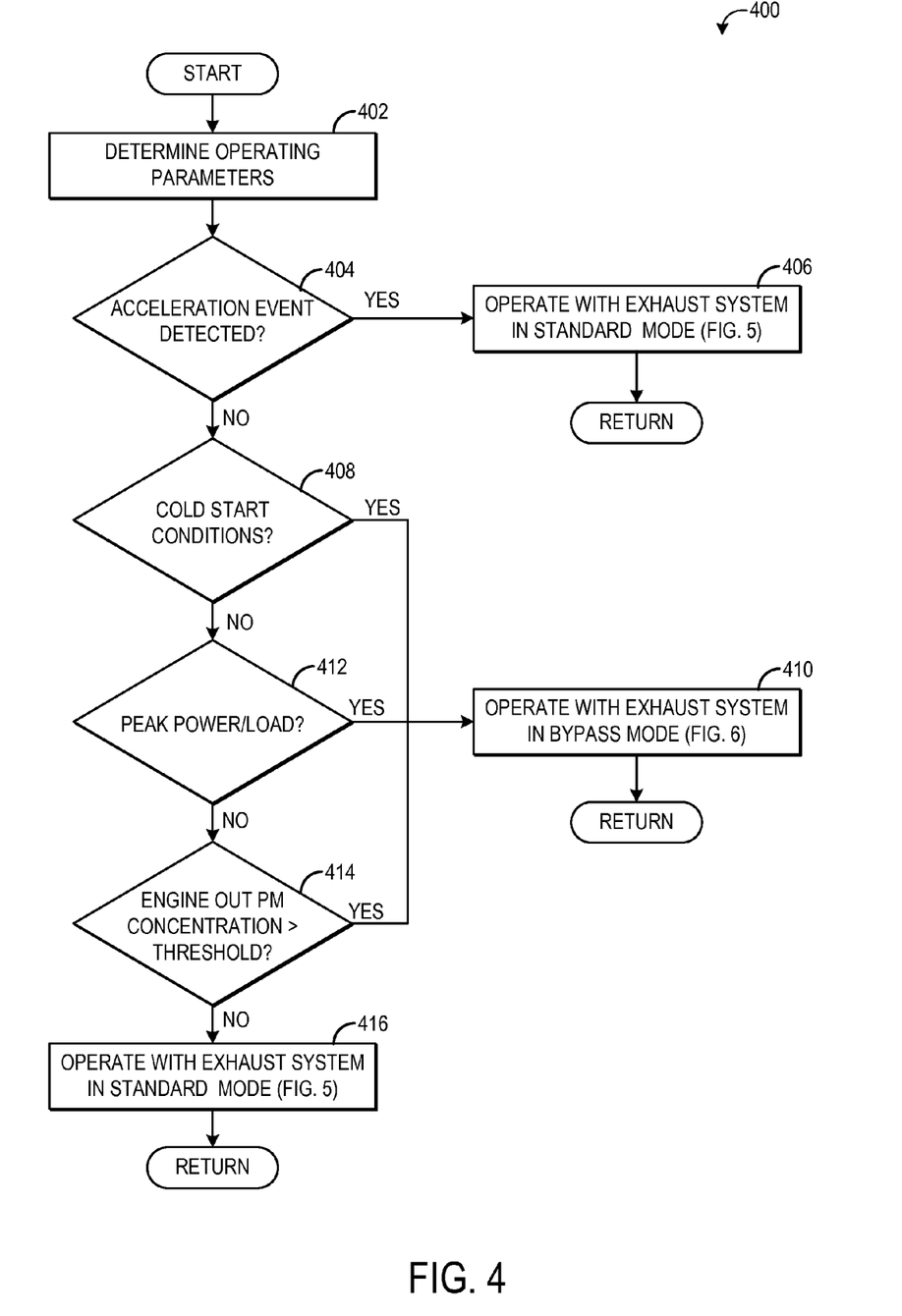
FIG. 4 is a flow chart illustrating a method for determining a mode of operation for an exhaust system.

Thus, the exhaust system 70 may be operated in either a standard mode of operation or a bypass mode of operation in order to route exhaust through the turbine before the at least one aftertreatment device, or to route exhaust through the at least one aftertreatment device before the turbine. The mode of operation may be selected based on operating conditions in order to provide a rapid turbocharger response, expedite catalyst warm-up, or other parameter. FIG. 4 is a flow chart illustrating a method 400 for selecting an exhaust system mode of operation. Method 400 may be carried out in order to operate an exhaust system, such as exhaust system 70 of FIGS. 1-3, in a desired mode of operation. Instructions for carrying out method 400 and the rest of the methods included herein may be executed by a controller (e.g., controller 12) based on instructions stored on a memory of the controller and in conjunction with signals received from sensors of the engine system, such as the sensors described above with reference to FIGS. 1-3. The controller may employ engine actuators of the engine system, such as the three-way valves, wastegate, throttle, etc., to adjust engine operation, according to the methods described below.

At 402, method 400 includes determining operating parameters. The determined operating parameters may include, but are not limited to, engine speed, requested torque, engine temperature, boost pressure, engine output, exhaust gas constituent concentration, and other parameters. At 404, based on the determined operating parameters, method 400 determines if a vehicle or engine acceleration event is detected. The vehicle or engine acceleration event may be detected based on an increase in engine or vehicle speed, change in accelerator pedal position, or other parameter. During an acceleration event, an increase in engine torque is requested, and thus as much exhaust energy as possible may be directed to the turbine to provide desired boost pressure to meet the torque request. Accordingly, if the acceleration event is detected, method 400 proceeds to 406 to operate with the exhaust system in the standard mode in order to directly flow exhaust to the turbine. Operation in the standard mode will be described in more detail below with respect to FIG. 5. Method 400 then returns.

If an acceleration event is not detected, method 400 proceeds to 408 to determine if the engine is operating under cold start conditions. Cold start conditions may include engine temperature below a threshold temperature, catalyst temperature below a threshold temperature, engine temperature being equal to ambient temperature at start-up, less than a threshold amount of time having elapsed since an engine start, or other suitable parameters. In engine cold start conditions, engine temperature may be below standard operating temperature (e.g., 100° F.) and thus one or more aftertreatment devices in the exhaust, such as a TWC, may be below light-off temperature. To expedite aftertreatment device warm-up, exhaust may be routed through the one or more aftertreatment devices before being routed through a turbine, and thus if the engine is operating under cold start conditions, method 400 proceeds to 410 to operate with the exhaust system in a bypass mode, which will be explained in more detail below with respect to FIG. 6.

If the engine is not operating under cold start conditions, for example if engine temperature is above a threshold temperature, method 400 proceeds to 412 to determine if the engine operating under peak power and/or load conditions. Peak power and/or load conditions may include maximum engine load and/or power output, and may be detected based on mass air flow, exhaust temperature, intake throttle position, or other suitable parameter. When the engine is operating under peak power and/or load conditions, exhaust temperature may reach relatively high temperatures that may lead to turbine damage, and thus it may be desirable to first flow exhaust through the aftertreatment devices, in order to reduce the temperature and/or pressure of the exhaust that reaches the turbine. Such an operation may improve engine efficiency, for example. Thus, if it is determined that the engine is operating under peak power and/or load conditions, method 400 proceeds to 410 to operate in the bypass mode.

If the engine is not operating under peak power and/or load, method 400 proceeds to 414 to determine if engine out particulate matter concentration is greater than a threshold concentration. Engine out particulate matter concentration may be estimated based on operating conditions, or it may be measured by a particulate matter sensor located in the exhaust. If the particulate matter concentration is greater than the threshold, the turbine may experience degradation when the particulate matter impinges on the turbine blades, and thus it may be desirable to first route the exhaust through a particulate filter. The threshold particulate matter concentration may be based on a tolerance of the turbine to withstand particulate matter, for example.

Accordingly, if the engine out particulate matter concentration is greater than the threshold, method 400 proceeds to 410 to operate in the bypass mode. If the engine out particulate matter concentration is not greater than the threshold, method 400 proceeds to 416 to operate with the exhaust system in the standard mode, as will be described below. Method 400 then returns.

Thus, method 400 includes operating with the exhaust system in the standard mode of operation, where exhaust first travels through the turbine before traveling through one or more aftertreatment devices, during most engine operating conditions. However, the exhaust system may be operated in the bypass mode of operation, where exhaust first travels through the at least one aftertreatment device before traveling through the turbine, in response to certain operating conditions. These may include during cold start conditions, peak power and/or load conditions, and when engine out particulate matter concentration is greater than a threshold. In another example, the engine may be operated in the bypass mode when regeneration of one of the aftertreatment devices, such as a particulate filter, is indicated. Further, the standard mode of operation may be prioritized during an acceleration event, particularly when boost pressure is relatively low or when exhaust temperature is low, in order to ensure that requested torque is rapidly delivered. This prioritization may include operating in the standard mode responsive to an acceleration event, even when the engine is operating under cold start conditions, particulate matter concentration is above the threshold, etc. However, if exhaust temperature is relatively high, the exhaust system may be operated in the bypass mode, even during an acceleration event, to prevent high temperature exhaust from degrading the turbine.

Figure 5:
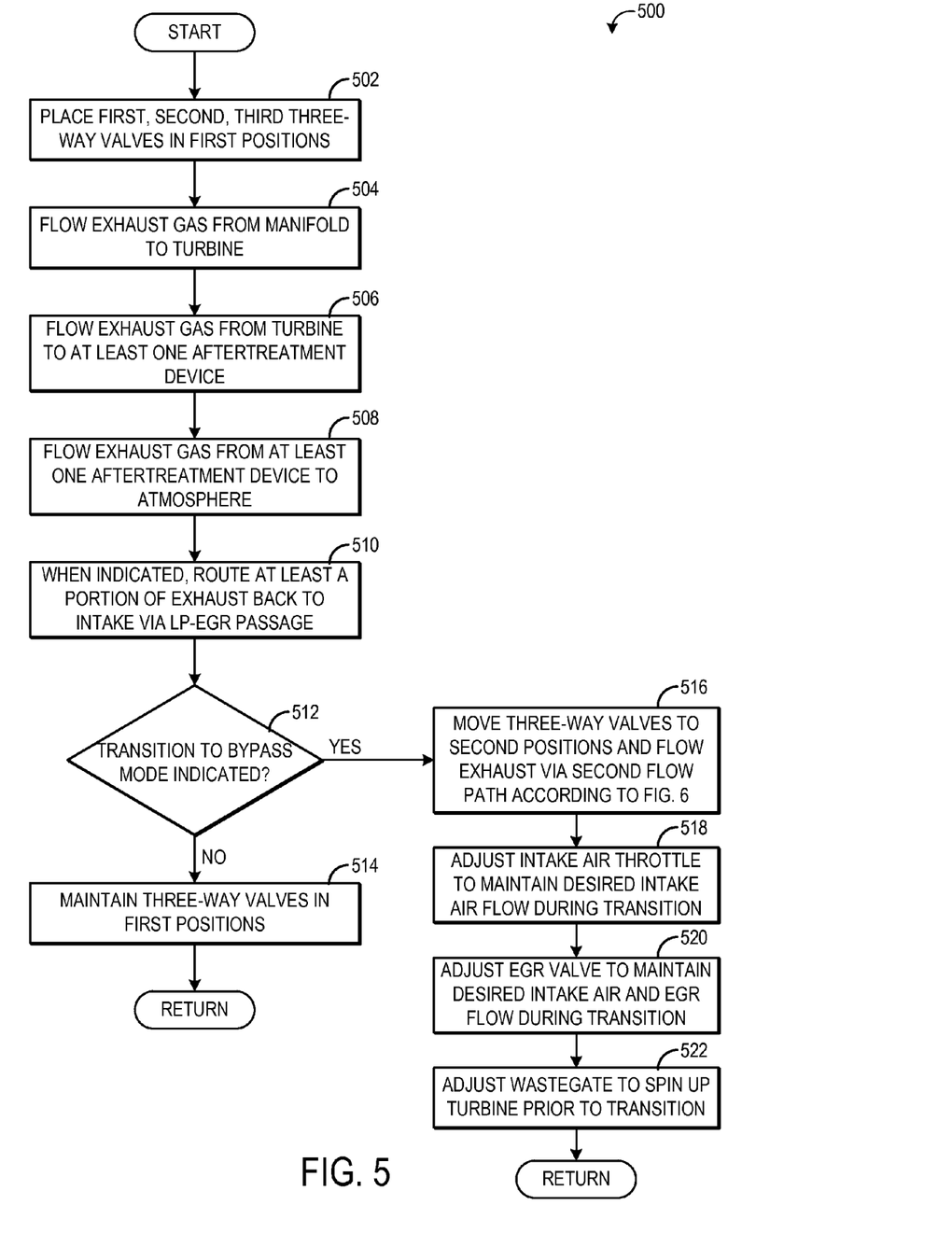
FIG. 5 is a flow chart illustrating a method for operating an exhaust system in a standard mode.

FIG. 5 is a flow chart illustrating a method 500 for operating with an exhaust system, such as exhaust system 70 of FIGS. 1-3, in the standard mode of operation. Method 500 may be executed as part of method 400, for example in response to a detected acceleration event. At 502, method 500 includes placing each of a first, second, and third three-way valves in respective first positions. As explained above with respect to FIG. 2, when all of the first, second, and third three-way valves are placed in the first positions, exhaust travels through the exhaust system along a first flow path. The first flow path includes flowing exhaust from an exhaust manifold to a turbine, as indicated at 504. The first flow path further includes flowing exhaust from the turbine to (and through) at least one exhaust aftertreatment device, as indicated at 506. The first flow path further includes flowing exhaust from the at least one aftertreatment device to atmosphere, as indicated at 508.

When indicated, method 500 also includes, at 510, routing at least a portion of exhaust back to an intake of the engine via an LP-EGR passage. The amount of exhaust routed to the intake via the LP-EGR passage may be based on engine speed and load, combustion stability, and/or other conditions, in order to maintain a desired intake oxygen concentration, combustion temperature, engine out NOx concentration, etc.

At 512, method 500 includes determining if a transition to the bypass mode of operation is indicated. This may include an acceleration event ending while engine temperature is below a threshold, particulate matter from the engine exceeding a threshold, a command to regenerate an aftertreatment device, exhaust temperature exceeding a threshold, or other suitable parameter. If a transition to bypass mode is not indicated, method 500 proceeds to 514 to maintain the three-way valves in the first positions and continue to flow exhaust along the first flow path. Method 500 then returns.

If it is determined at 512 that a transition to the bypass mode is indicated, method 500 proceeds to 516 to move the first, second, and third three-way valves to the respective second positions and flow exhaust along the second flow path according to method 600 of FIG. 6, which will be explained in more detail below. During the transition from the standard to bypass mode, a transient drop in boost pressure may occur due to a delay in exhaust reaching the turbine as the exhaust system switches from flowing exhaust directly from the exhaust manifold to the turbine and instead starts to flow the exhaust through the aftertreatment device(s) first. As the exhaust initially flows through the aftertreatment devices, there may be a short time interval where exhaust is not rotating the turbine. Further, the exhaust reaching the turbine may be cooler or at a different pressure than when operating under the standard mode. Collectively, this may result in a drop of boost pressure during the transition.

Accordingly, method 500 includes one or more actions that may be taken to mitigate this drop in boost pressure. This may include, at 518, adjusting an intake air throttle to maintain desired intake air flow during the transition. Additionally or alternatively, method 500 includes adjusting the LP-EGR valve to maintain desired intake air and EGR flow during the transition. For example, the LP-EGR valve may be opened by a larger degree to flow more EGR during the transition to compensate for a transient drop exhaust pressure downstream of the turbine. The extent to which the intake throttle and/or LP-EGR valve are adjusted may be based on initial turbine speed and/or exhaust temperature. For example, when the turbine is rotating at high speed and/or when the exhaust is at standard, warmed-up exhaust temperature, the turbine may have sufficient rotational energy to maintain its speed even during the temporary lag in exhaust impinging on the turbine. However, if the turbine speed is low or if exhaust temperature is low, the resultant delay in exhaust energy reaching the turbine may create a perceptible drop in boost pressure that may be compensated by the throttle and/or LP-EGR valve adjustment. Further, in some examples, method 500 may include adjusting the turbine wastegate to spin up the turbine prior to the transition. For example, the wastegate may be moved to a more closed position to transiently increase turbine speed prior to the transition. Method 500 then returns.

Figure 6:
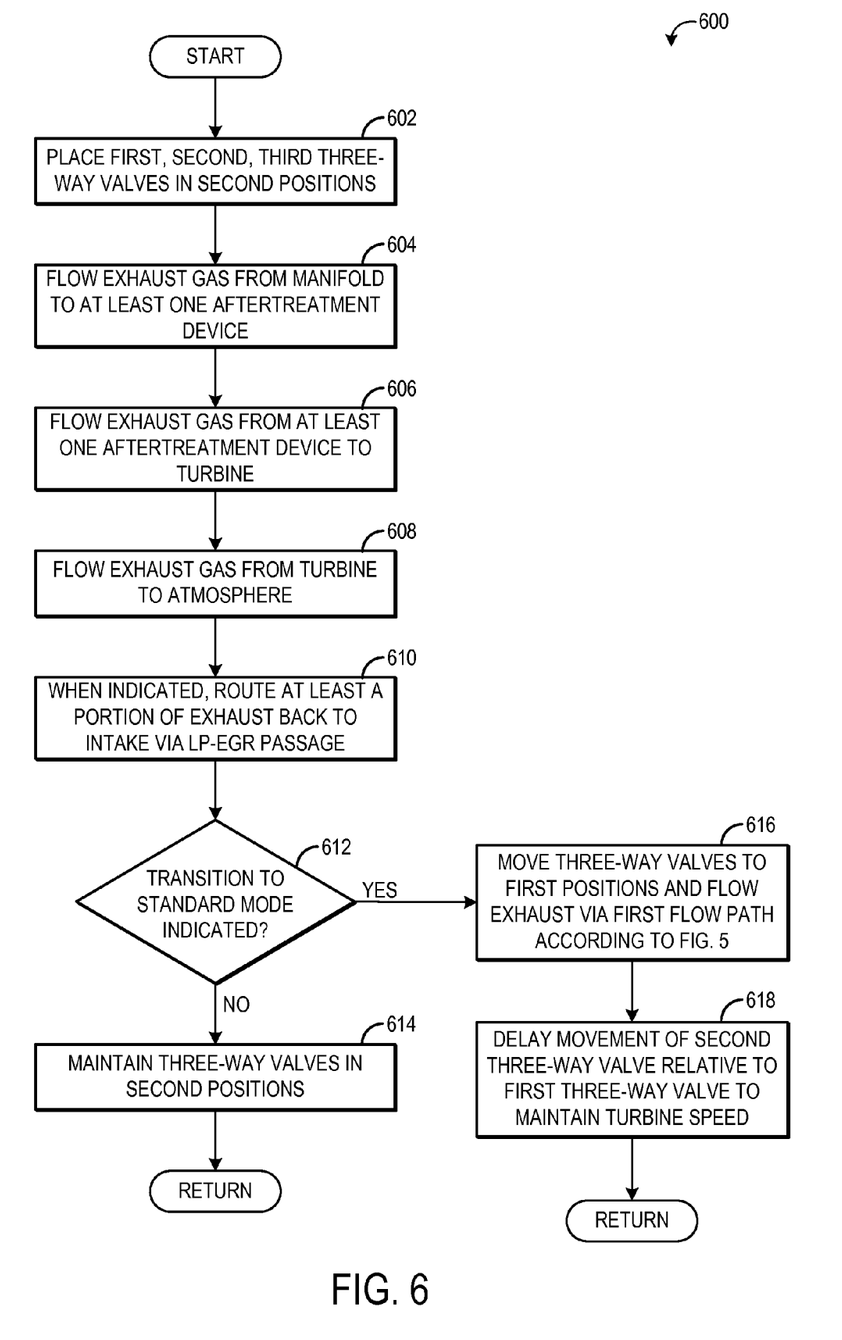
FIG. 6 is a flow chart illustrating a method for operating an exhaust system in a bypass mode.

FIG. 6 is a flow chart illustrating a method 600 for operating with an exhaust system, such as exhaust system 70 of FIGS. 1-3, in the bypass mode of operation. Method 600 may be executed as part of method 400 or 500, for example in response to cold start conditions. At 602, method 600 includes placing each of a first, second, and third three-way valves in respective second positions. As explained above with respect to FIG. 3, when all of the first, second, and third three-way valves are placed in the second positions, exhaust travels through the exhaust system along a second flow path. The second flow path includes flowing exhaust from an exhaust manifold to (and through) at least one aftertreatment device, as indicated at 604. The second flow path further includes flowing exhaust from the at least one exhaust aftertreatment device to a turbine, as indicated at 606. The second flow path further includes flowing exhaust from the turbine to atmosphere, as indicated at 608.

When indicated, method 600 also includes, at 610, routing at least a portion of exhaust back to an intake of the engine via an LP-EGR passage. The amount of exhaust routed to the intake via the LP-EGR passage may be based on engine speed and load, combustion stability, and/or other conditions, in order to maintain a desired intake oxygen concentration, combustion temperature, engine out NOx concentration, etc.

At 612, method 600 includes determining if a transition to the standard mode of operation is indicated. This may include an acceleration event occurring, engine temperature reaching a threshold temperature, engine load dropping below peak load, or other suitable parameter. If a transition to standard mode is not indicated, method 600 proceeds to 614 to maintain the three-way valves in the second positions and continue to flow exhaust along the second flow path. Method 600 then returns.

If it is determined at 612 that a transition to the bypass mode is indicated, method 600 proceeds to 616 to move the first, second, and third three-way valves to the respective first positions and flow exhaust along the first flow path according to method 500 of FIG. 5, described above. During the transition from the bypass to the standard mode, the timing of the movement of the first and second three-way valves may be controlled to ensure exhaust is not routed to atmosphere via the second three-way valve before exhaust from the first passage reaches the turbine. Thus, method 600 may include, at 618, delaying movement of the second three-way valve to the first position relative to the movement of the first three-way valve to the first position. For example, the controller may send a signal to move the first three-way valve from the second position to the first position responsive to the indication to transition to the standard mode. The controller may delay sending the signal to move the second three-way valve from the second position to the first position by a given amount of time. The delay time may be based on the length of the first passage, exhaust mass flow through the first passage, etc., such that the exhaust in the second passage begins to be routed to atmosphere at the same time or just prior to when exhaust in the first passage reaches the turbine. Method 600 then returns.

In this way, an exhaust system of an engine system in a vehicle may be operated in one of a bypass mode or a standard mode. During operation in the standard mode, exhaust first flows through the turbine before reaching the exhaust aftertreatment devices, allowing for maximum extraction of exhaust energy via the turbocharger. This may be particularly useful during a vehicle launch or other conditions traditionally associated with turbocharger lag, as rapid turbine response (e.g., spin up) is desired to deliver the requested torque. During operation in the bypass mode, the exhaust flows through the aftertreatment devices before reaching the turbine. This may allow for rapid catalyst warm-up during cold start conditions, and also may prevent high temperature exhaust, particulate matter, or other exhaust components that may degrade the turbine from reaching the turbine. Additionally, exhaust backpressure may be reduced in the bypass mode of operation. Further, in both modes of operation, exhaust still flows through the aftertreatment devices and is fed to the turbine, allowing for emissions compliance and increased engine performance under all operating conditions, without having to adjust the packing of the engine components.

The technical effect of operating an engine system with an exhaust system in either a bypass or standard mode of operation is expedited catalyst warm-up under cold start conditions while still providing fast turbine response during acceleration events.

An example relates to a method. The method includes, during a first condition, flowing exhaust gas through a turbine, from the turbine to at least one aftertreatment device, and then from the at least one aftertreatment device to atmosphere; and during a second condition, flowing exhaust gas through the at least one aftertreatment device, from the at least one aftertreatment device to the turbine, and then from the turbine to atmosphere.

In a first example, the method further includes the first condition comprising an engine acceleration event. A second example of the method optionally includes the first example and further includes the second condition comprising engine temperature below a threshold temperature and is mutually exclusive of the first condition. A third example of the method optionally includes any or all of the first and second examples and further includes the second condition comprising engine output above a threshold output. A fourth example of the method optionally includes any or all of the first, second, and third examples and further includes during the first condition, flowing at least a portion of the exhaust gas to an intake of an engine via an exhaust gas recirculation passage, the exhaust gas recirculation passage receiving exhaust gas at a location between the turbine and the at least one aftertreatment device. A fifth example of the method optionally includes any or all of the first, second, third, and fourth examples and further includes during the second condition, flowing at least a portion of the exhaust gas to an intake of an engine via an exhaust gas recirculation passage, the exhaust gas recirculation passage receiving exhaust gas at a location between the turbine and atmosphere. A sixth example of the method optionally includes any or all of the first, second, third, fourth, and fifth examples and further includes wherein flowing exhaust gas through the turbine, from the turbine to at least one aftertreatment device, and then from the at least one aftertreatment device to atmosphere comprises placing a first three-way valve, a second three-way valve, and a third three-way valve in respective first positions. A seventh example of the method optionally includes any or all of the first, second, third, fourth, fifth, and sixth examples and further includes wherein flowing exhaust gas through the at least one aftertreatment device, from the at least one aftertreatment device to the turbine, and then from the turbine to atmosphere comprises placing the first three-way valve, the second three-way valve, and the third three-way valve in respective second positions. An eighth example of the method optionally includes any or all of the first, second, third, fourth, fifth, sixth, and seventh examples and further includes responsive to a transition from the first condition to the second condition, adjusting one or more of an intake throttle valve and an exhaust gas recirculation valve to maintain desired intake air flow. A ninth example of the method optionally includes any or all of the first, second, third, fourth, fifth, sixth, seventh, and eighth examples and further includes wherein the one or more of the intake throttle valve and exhaust gas recirculation valve are further adjusted based on boost pressure. A tenth example of the method optionally includes any or all of the first, second, third, fourth, fifth, sixth, seventh, eighth, and ninth examples and further includes wherein adjusting one or more of the intake throttle valve and the exhaust gas recirculation valve comprises temporarily increasing an opening of the exhaust gas recirculation valve to maintain desired exhaust gas recirculation flow during the transition.

Another example relates to a system. The system comprises an engine having an exhaust manifold; a turbocharger turbine fluidically coupled to the exhaust manifold via a first passage; a second passage branching off the first passage upstream of the turbine and having an outlet fluidically coupled to the turbine; a first three-way valve at a junction between the first passage and the second passage; at least one aftertreatment device positioned in the second passage; a second three-way valve positioned in the second passage upstream of the turbine and downstream of the at least one aftertreatment device, the second three-way valve coupling the second passage to atmosphere; a third passage fluidically coupled to an outlet of the turbine and to the second passage upstream of the at least one aftertreatment device; and a third three-way valve coupling the third passage to atmosphere.

In a first example of the system, the system further includes an electronic controller having instructions to, during a first condition, place each of the first, second, and third three-way valves in respective first positions to flow exhaust from the exhaust manifold to the turbine via the first passage, and from the turbine to the at least one aftertreatment device via the third passage, and from the at least one aftertreatment device to atmosphere. In a second example of the system, the system optionally includes the first example of the system and further includes wherein the electronic controller has instructions to, during a second condition, place each of the first, second, and third three-way valves in respective second positions to flow exhaust from the exhaust manifold to the at least one aftertreatment device via the first and second passages, from the at least one aftertreatment device to the turbine via the second passage, and from the turbine to atmosphere. In a third example of the system, the system optionally includes any or all of the first and second examples of the system and further includes wherein when each of the first, second, and third three-way valves are in the respective first positions, the first three-way valve is configured to direct exhaust only to the turbine, the second three-way valve is configured to direct exhaust only to atmosphere, and the third three-way valve is configured to direct exhaust only to the at least one aftertreatment device. In a fourth example of the system, the system optionally includes any or all of the first, second, and third examples of the system and further includes wherein when each of the first, second, and third three-way valves are in the respective second positions, the first three-way valve is configured to direct exhaust only to the second passage, the second three-way valve is configured to direct exhaust only to the turbine, and the third three-way valve is configured to direct exhaust only to atmosphere. In a fifth example of the system, the system optionally includes any or all of the first, second, third, and fourth examples of the system and further includes a low-pressure exhaust gas recirculation passage having an inlet coupled to the third passage upstream of the third three-way valve and an outlet coupled to an intake of the engine.

A further example relates to a second method. The second method comprises selectively flowing exhaust gas via a first flow path that includes flowing the exhaust gas through a turbine, from the turbine to a particulate filter, and then from the particulate filter to atmosphere; and responsive to an estimated concentration of engine-out particulate matter exceeding a threshold, flowing exhaust gas via a second flow path that includes flowing the exhaust gas through the particulate filter, from the particulate filter to the turbine, and from the turbine to atmosphere.

In a first example of the second method, the second method further comprises responsive to an estimated particulate load on the particulate filter, flowing exhaust gas via the second flow path. In a second example of the second method, the second method optionally includes the first example and further includes wherein selectively flowing exhaust gas via the first flow path comprises flowing exhaust gas via the first flow path responsive to an engine acceleration event.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a first condition, flowing exhaust gas through a turbine, from the turbine to at least one aftertreatment device, and then from the at least one aftertreatment device to atmosphere; and
during a second condition, flowing exhaust gas through the at least one aftertreatment device, from the at least one aftertreatment device to the turbine, and then from the turbine to atmosphere.

2. The method of claim 1, wherein the first condition comprises an engine acceleration event.

3. The method of claim 1, wherein the second condition comprises engine temperature below a threshold temperature and is mutually exclusive of the first condition.

4. The method of claim 1, wherein the second condition comprises engine output above a threshold output.

5. The method of claim 1, further comprising, during the first condition, flowing at least a portion of the exhaust gas to an intake of an engine via an exhaust gas recirculation passage, the exhaust gas recirculation passage receiving exhaust gas at a location between the turbine and the at least one aftertreatment device.

6. The method of claim 1, further comprising, during the second condition, flowing at least a portion of the exhaust gas to an intake of an engine via an exhaust gas recirculation passage, the exhaust gas recirculation passage receiving exhaust gas at a location between the turbine and atmosphere.

7. The method of claim 1, wherein flowing exhaust gas through the turbine, from the turbine to at least one aftertreatment device, and then from the at least one aftertreatment device to atmosphere comprises placing a first three-way valve, a second three-way valve, and a third three-way valve in respective first positions.

8. The method of claim 7, wherein flowing exhaust gas through the at least one aftertreatment device, from the at least one aftertreatment device to the turbine, and then from the turbine to atmosphere comprises placing the first three-way valve, the second three-way valve, and the third three-way valve in respective second positions.

9. The method of claim 1, further comprising, responsive to a transition from the first condition to the second condition, adjusting one or more of an intake throttle valve and an exhaust gas recirculation valve to maintain desired intake air flow.

10. The method of claim 9, wherein the one or more of the intake throttle valve and exhaust gas recirculation valve are further adjusted based on boost pressure.

11. The method of claim 9, wherein adjusting one or more of the intake throttle valve and the exhaust gas recirculation valve comprises temporarily increasing an opening of the exhaust gas recirculation valve to maintain desired exhaust gas recirculation flow during the transition.

12. A system, comprising:
an engine having an exhaust manifold;
a turbocharger turbine fluidically coupled to the exhaust manifold via a first passage;
a second passage branching off the first passage upstream of the turbine and having an outlet fluidically coupled to the turbine;
a first three-way valve at a junction between the first passage and the second passage;
at least one aftertreatment device positioned in the second passage;
a second three-way valve positioned in the second passage upstream of the turbine and downstream of the at least one aftertreatment device, the second three-way valve coupling the second passage to atmosphere;
a third passage fluidically coupled to an outlet of the turbine and to the second passage upstream of the at least one aftertreatment device; and
a third three-way valve coupling the third passage to atmosphere.

13. The system of claim 12, further comprising an electronic controller having instructions to, during a first condition, place each of the first, second, and third three-way valves in respective first positions to flow exhaust from the exhaust manifold to the turbine via the first passage, and from the turbine to the at least one aftertreatment device via the third passage, and from the at least one aftertreatment device to atmosphere.

14. The system of claim 13, wherein the electronic controller has instructions to, during a second condition, place each of the first, second, and third three-way valves in respective second positions to flow exhaust from the exhaust manifold to the at least one aftertreatment device via the first and second passages, from the at least one aftertreatment device to the turbine via the second passage, and from the turbine to atmosphere.

15. The system of claim 14, wherein when each of the first, second, and third three-way valves are in the respective first positions, the first three-way valve is configured to direct exhaust only to the turbine, the second three-way valve is configured to direct exhaust only to atmosphere, and the third three-way valve is configured to direct exhaust only to the at least one aftertreatment device.

16. The system of claim 15, wherein when each of the first, second, and third three-way valves are in the respective second positions, the first three-way valve is configured to direct exhaust only to the second passage, the second three-way valve is configured to direct exhaust only to the turbine, and the third three-way valve is configured to direct exhaust only to atmosphere.

17. The system of claim 12, further comprising a low-pressure exhaust gas recirculation passage having an inlet coupled to the third passage upstream of the third three-way valve and an outlet coupled to an intake of the engine.

18. A method comprising:
selectively flowing exhaust gas via a first flow path that includes flowing the exhaust gas through a turbine, from the turbine to a particulate filter, and then from the particulate filter to atmosphere; and
responsive to an estimated concentration of engine-out particulate matter exceeding a threshold, flowing exhaust gas via a second flow path that includes flowing the exhaust gas through the particulate filter, from the particulate filter to the turbine, and from the turbine to atmosphere.

19. The method of claim 17, further comprising, responsive to an estimated particulate load on the particulate filter, flowing exhaust gas via the second flow path.

20. The method of claim 17, wherein selectively flowing exhaust gas via the first flow path comprises flowing exhaust gas via the first flow path responsive to an engine acceleration event.

* * * * *